Dec. 11, 1962     F. W. SAMPSON     3,067,493
FRICTION MATERIAL
Filed July 27, 1959

INVENTOR.
Frederick W. Sampson
BY
His Attorney

3,067,493
FRICTION MATERIAL
Frederick W. Sampson, Dayton, Ohio, assignor to General Motors Corporation, Detroit, Mich., a corporation of Delaware
Filed July 27, 1959, Ser. No. 829,850
10 Claims. (Cl. 29—182.5)

This invention relates to friction materials and is particularly concerned with ferrous friction members for use as clutches, brakes and the like.

This application is related to copending applications Ser. No. 776,973, filed November 28, 1958, now Patent No. 2,945,291, issued July 19, 1960, Ser. No. 776,978, filed November 28, 1958, now Patent No. 2,945,292, issued July 19, 1960, and Ser. No. 684,853, filed September 19, 1957, now Patent No. 2,945,759, all of said copending applications being assigned to the assignee of the present invention.

The main object of this invention is to provide an improved ferrous friction facing consisting essentially of iron and graphite together with other additives both metallic and nonmetallic wherein the ferrous portion of the member consists of an alloy of iron and nickel wherein the nickel ranges between 32% and 40% with the balance substantially all iron.

A further object of the invention is to provide a ferrous friction element including graphite wherein the coefficient of friction of the element is stabilized over a wide range of temperatures.

In carrying out the above objects, it is a still further object of the invention to provide a ferrous friction member consisting essentially of a ferrous alloy component together with graphite in percentages of from 10% to 30% by weight together with from not over about 18½% by weight of other metallic and nonmetallic ingredients, said ferrous alloy component consisting of an alloy of iron and nickel wherein the nickel varies between 32% and 40% by weight of the alloy. A preferred embodiment is directed to a friction member where the ferrous alloy component is essentially a 36% nickel-iron alloy known as "Invar."

Further objects and advantages of the present invention will be apparent from the following description, reference being had to the accompanying drawings wherein preferred embodiments of the present invention are clearly shown.

Figure 1:
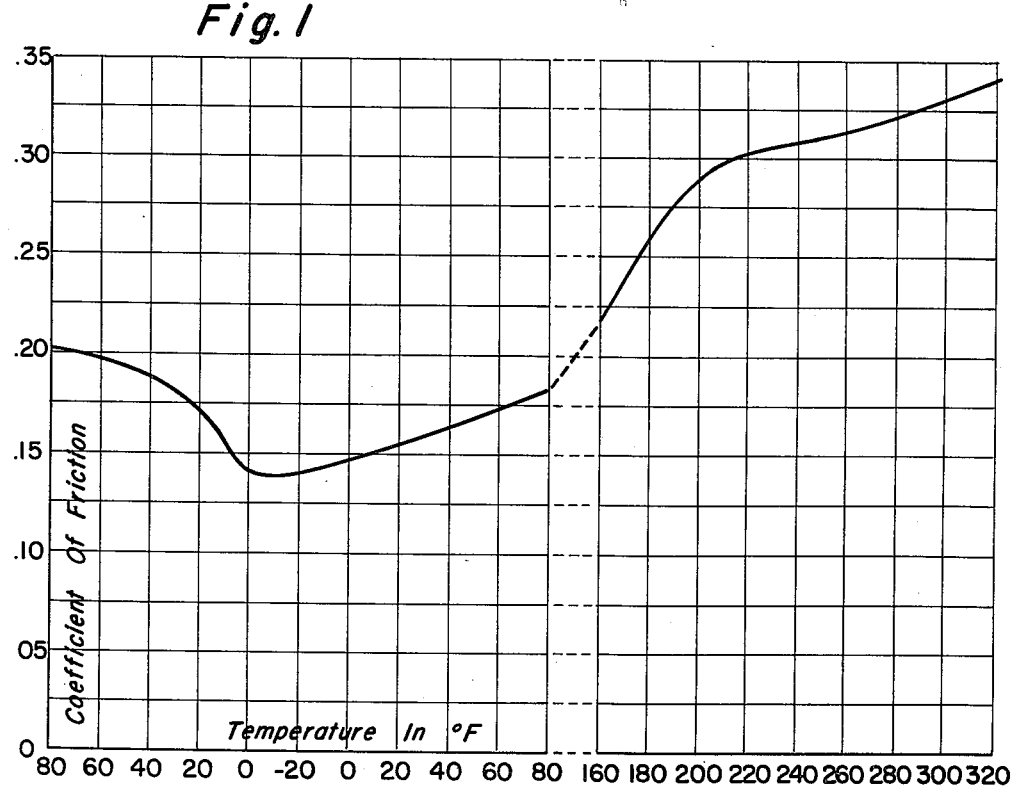
FIGURE 1 is a chart showing friction coefficient plotted against temperature for a friction material using sponge iron in the unalloyed condition.

In the aforementioned copending applications, ferrous friction materials are disclosed wherein sintered iron forms the basis of the material and wherein reasonably large quantities of graphite are held mechanically within the iron and are dispersed therethrough. These friction materials may or may not include varying quantities of friction modifying agents such as copper, bismuth, mullite, lead and sulfur. These friction modifying agents each have a function as disclosed in the aforementioned applications and form no part of this invention. These friction modifying agents, for the most part, are not readily alloyable with the iron.

All of the aforementioned ferrous friction materials have one drawback which is transient in nature but which, nevertheless, is an important factor in the use of a brake, for example, on an automotive vehicle.

All of these prior art friction materials have a variable coefficient of friction with respect to hot and cold operation. I have found that, when these friction materials are heated as, for example, by use of the brake, a build-up of heat occurs therein and the coefficient of friction rises whereas, when the friction materials are cold, the coefficient of friction drops. This results in what is frequently termed in the trade as "cold pedal." Explaining this term more fully, "cold pedal" occurs when the brake is applied after a period of rest and when the brake is cold. Thus, on the first operation of the brake in the morning, it is not at all unusual to require considerably higher pedal pressures to stop the vehicle than are normally required after the brake has been used several times. Similarly, the variation in coefficient of friction from hot to cold operation is apparent when the brake becomes overheated due to high speed stops. In this case, however, one of the main features of metallic linings of the character described is the maintenance of a good coefficient of friction when the brake lining is hot. This is in complete differentiation to the organic type linings as, for example, resin-filled linings which lose their efficiency rapidly as the temperature rises and, thus, cause an extremely serious and dangerous condition when repeated stops are attempted from high speeds.

The metallic brake linings, particularly the sintered ferrous linings including graphite, therefore have a wide range of application due to their many desirable characteristics during operation and the only drawback heretofore noted is the tendency toward cold pedal. This has been overcome to a large degree by using combinations of organic and metallic linings whereby the organic lining yields satisfactory operation when the brake lining was cold and the metallic lining yields satisfactory operation when the brake lining was hot.

I have now found that, by utilizing specific combinations in the metallic brake lining, this "cold pedal" condition can be substantially reduced and practically eliminated. Furthermore, I believe that I have found the theoretical reason for "cold pedal" but, in any event, by following the teachings hereinafter set forth, the low coefficient of friction condition with a cold lining is substantially eliminated.

My theory for the occurrence of a low coefficient of friction in metallic linings when cold is based on the fact that the sintered metal portion of the lining has one coefficient of expansion while the graphite, which is mechanically held within the interstices of the metal, has a different and lower coefficient of expansion. After the lining is worn in, the areas of actual contact between lining and drum include portions of graphite and portions of metal. However, when this same lining is cold, the metal, due to its greater coefficient of expansion, will recede slightly away from the contacting surface allowing the graphite or other material of lower coefficient of expansion to remain in place and, thus, be the first material to contact the brake drum upon application of the brake. This condition will change the over-all coefficient of friction of the brake and appreciably lower the same. As soon as the same brake becomes heated, the metallic materials which form the porous framework of the brake lining will expand due to their greater coefficient of expansion and take over as the main portion of the rubbing surface whereby the lower coefficient of friction in the graphite will be minimized and the graphite will again be used as a friction modifying agent for providing smooth operation. Thus, according to temperature, the materials of the brake lining which rub against the mating drum surface vary whereby, at one time, when the brake lining is cold, graphite with its lower coefficient of friction is the main friction material and, at another time, when the brake lining is hot, the metal portions thereof become the main friction surface. In this manner, it can be readily understood that the coefficient of friction of the over-all lining material will vary in accordance with temperature.

In order to overcome this difficulty, I have discovered that, if the ferrous ingredient is one which has a low coefficient of thermal expansion and one that preferably does not exceed the coefficient of expansion of graphite, a more constant frictional output can be obtained from the brake lining. To this end, I have found that, in place of iron, an iron-nickel alloy preferably having a 36% nickel content may be used and this metallic ingredient has a substantially constant coefficient of expansion not greatly different from graphite over a given temperature range (the normal range of temperatures encountered in a brake) whereby the over-all coefficient of friction of the element is maintained substantially constant under high or low temperatures of the brake. An iron-nickel alloy containing 36% nickel is commonly known as "Invar." In this respect, if the iron and nickel are not completely alloyed prior to the time the powder is made, the improved conditions recited herein do not accrue. Iron-nickel alloys including nickel ranging from 32% to 40% yield satisfactory results since all of these alloys have expansion coefficients within substantially the same range as graphite.

It is apparent that any of the friction modifying materials, either metallic or nonmetallic as set forth in the copending applications, may be used to modify friction and smooth out operation of the device and that these materials, being in minor quantities, do not markedly effect the constancy of the frictional coefficient obtained by the inclusion of the new combination of the iron-nickel alloy with the graphite. These added materials form no part of this invention.

Figure 2:
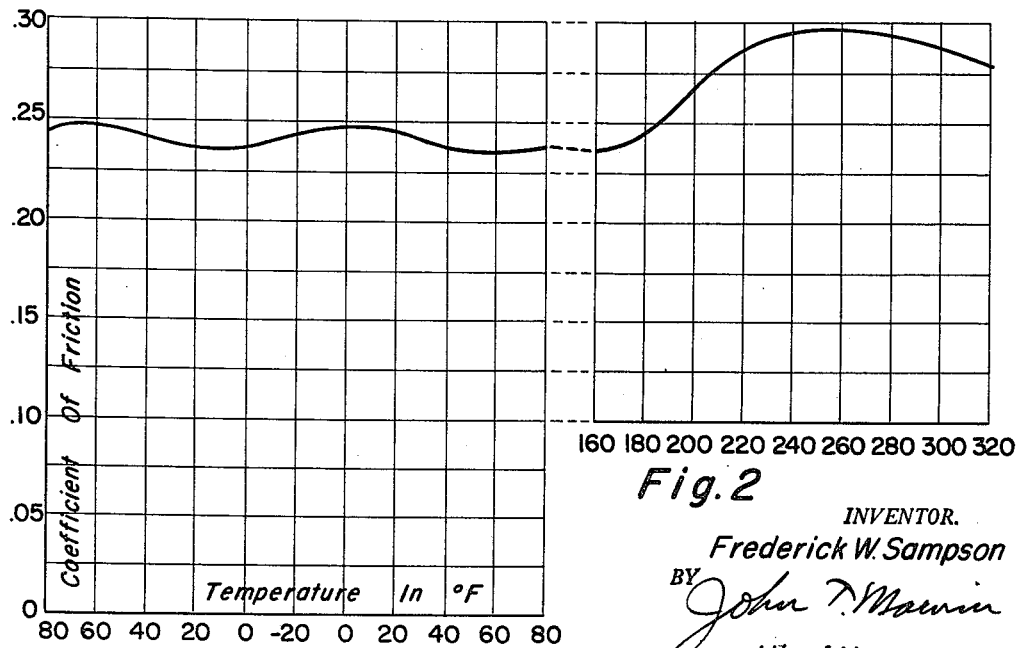
FIGURE 2 is a chart showing the coefficient of friction plotted against temperature for a friction material wherein the ferrous component is an iron-nickel alloy having 36% nickel therein.

Referring to FIGURE 1, a typical test curve is shown for a sintered friction material which, in this case, was specifically made from a sintered mixture as follows:

67 parts sponge iron
15 parts powdered artificial graphite (density 1.85 grams per cc., —325 mesh)
15 parts coarse flake natural graphite (density about 2.1 grams per cc., 20 to 30 mesh)
5 parts 150 mesh copper powder
5 parts 100 mesh bismuth
5 parts 100 mesh lead This mixture may include ½ part 60 mesh synthetic mullite if desired. It will be seen that, in this test, the coefficient of friction was .205 at the start of the test at 80° F. and dropped to .18 when the temperature dropped to —6° F. It then rose to .275 when the temperature was raised to 300° F. This curve, therefore, is indicative of the rather considerable changes in coefficient of friction that occur when using conventional materials. On the other hand, in FIGURE 2, a similar set of curves is shown for a friction material made from a sintered mixture of the following:

67 parts iron-nickel alloy (36% nickel-64% iron)
15 parts powdered artificial graphite (density 1.85 grams per cc., —325 mesh)
15 parts coarse flake natural graphite (density about 2.1 grams per cc., 20 to 30 mesh)
5 parts 150 mesh copper powder
5 parts 100 mesh bismuth
5 parts 100 mesh lead This mixture may include ½ part 60 mesh synthetic mullite if desired. In this instance, the initial coefficient of friction at 81° F. was .225. When the temperature was reduced to —8° F., the coefficient of friction remained the same. The temperature was again raised to 81° F. without change in the coefficient of friction. As the temperature was raised to 150° F., the coefficient of friction dropped slightly and then increased but little as the temperature was raised further. In other words, by using the iron-nickel alloy as the base ferrous material in combination with the graphite, it is possible to stabilize the coefficient of friction of the material over a wide range of temperatures whereby only small changes occurred.

Some specific examples of useful mixtures are as follows:

*Example 1*

67 parts iron-nickel alloy (36% nickel-64% iron)
20 parts artificial graphite (density 1.85 grams per cc., —325 mesh)
8 parts 150 mesh copper powder
5 parts 100 mesh bismuth powder

*Example 2*

67 parts iron-nickel alloy (32% nickel-68% iron)
15 parts powdered artificial graphite (density 1.85 grams per cc., —325 mesh)
15 parts coarse flake natural graphite (density about 2.1 grams per cc., 20 to 30 mesh)
5 parts 150 mesh copper powder
5 parts 100 mesh bismuth
5 parts 100 mesh lead This mixture may include ½ part 60 mesh synthetic mullite if desired.

*Example 3*

100 parts iron-nickel alloy (40% nickel-60% iron) (with or without 1% combined sulfur)
15 to 45 parts graphite
6 to 10 parts bismuth
0 to 9 parts copper
0 to 6 parts lead
0 to .8 part mullite

*Example 4*

100 parts iron-nickel alloy (62% iron-38% nickel)
11.5 parts coarse flake natural graphite
3.5 parts molybdenum disulfide

*Example 5*

100 parts iron-nickel alloy (65% iron-35% nickel)
12 parts coarse flake natural graphite
12 parts powdered artificial graphite
7 parts bismuth
2 parts lead
1 part copper

*Example 6*

55 parts iron-nickel alloy (60% iron-40% nickel)
15 parts coarse flake natural graphite
15 parts powdered artificial graphite
5 parts bismuth
5 parts lead
1 part sulfur combined with iron
.8 part mullite
1.2 parts molybdenum disulfide
2 parts copper All parts are expressed in parts by weight in all of the foregoing examples. Of all the added materials, copper is the only one that affects expansion appreciably.

It is appreciated that the alloying of the copper with the iron-nickel alloy will change the coefficient of expansion of the resulting material, and, for this reason, copper should be kept as low as possible, compatible with satisfactory operation. In practice, copper should not exceed 7% by weight in the alloy.

Where the graphite content is at a minimum of 10%, all of the graphite should be flake graphite for best results. It has also been found that flake graphite, possibly because of its orientation, presents less change in coefficient of friction from cold to hot conditions but in all instances there is a change that is reduced and/or eliminated by following the teachings of this invention.

The effect of copper as an alloying element in iron-nickel alloys is widely known and fully discussed in "Alloys of Iron and Nickel," Alloys of Iron Monographs, published by McGraw-Hill, 1938 edition.

It is also understood that cobalt acts similarly to nickel and that cobalt may be substituted up to 5% for the nickel in the iron-nickel alloy if desired. However, since the relative cost of cobalt is greater than that of nickel, the nickel is the most desirable for commercial purposes.

While the embodiments of the present invention as herein disclosed constitute preferred forms, it is to be understood that other forms might be adopted.

What is claimed is as follows:

1. A metallic friction member for use in rubbing contact with another surface wherein the coefficient of friction is stabilized over a wide range of operating temperatures consisting essentially of, a major percentage of a ferrous ingredient consisting of an iron-nickel alloy wherein the iron varies between 60% and 68% and the nickel varies between 40% and 32% by weight of the ingredient respectively, graphite ranging between 10% and 30% by weight of the element together with a minor percentage of a friction modifying agent taken from the class consisting of bismuth, copper, lead, mullite and molybdenum disulfide.

2. A metallic friction member for use in rubbing contact with another surface wherein the coefficient of friction is stabilized over a wide range of operating temperatures consisting essentially of, at least 67 parts of a ferrous ingredient consisting of an iron-nickel alloy wherein the iron varies between 60% and 68% and the nickel varies between 40% and 32% by weight of the ingredient respectively, graphite in quantities of at least 10 parts and not greater than 30 parts by weight wherein the proportion of flake graphite varies inversely between 100% and 50% of the graphite ingredient with artificial graphite making up the remainder together with minor percentages of a friction modifying agent taken from the class consisting of bismuth, copper, lead, mullite and molybdenum disulfide.

3. A metallic friction member for use in rubbing contact with another surface wherein the coefficient of friction is stabilized over a wide range of operating temperatures, consisting essentially of, 100 parts iron-nickel alloy wherein the iron varies between 60% and 68% of the alloy and wherein nickel makes up the remainder, 20 parts graphite, 8 parts copper and 5 parts bismuth.

4. A metallic friction member for use in rubbing contact with another surface wherein the coefficient of friction is stabilized over a wide range of operating temperatures, consisting essentially of, 67 parts iron-nickel alloy wherein the iron varies between 60% and 68% of the alloy and wherein nickel makes up the remainder, 15 parts artificial graphite, 15 parts flake graphite, 5 parts copper, 5 parts bismuth and 5 parts lead.

5. A metallic friction member for use in rubbing contact with another surface wherein the coefficient of friction is stabilized over a wide range of operating temperatures, consisting essentially of, a major percentage of a ferrous ingredient comprising an iron-nickel alloy consisting of 64% iron and 36% nickel, graphite ranging between 10% and 30% by weight of the element, wherein natural coarse flake graphite makes up 100% of the graphite ingredient at the low end of the graphite range and not more than 50% of the graphite ingredient at the high end of the graphite range, together with minor percentages of a friction modifying agent taken from the class consisting of bismuth, copper, lead, mullite and molybdenum disulfide.

6. A metallic friction member for use in rubbing contact with another surface wherein the coefficient of friction is stabilized over a wide range of operating temperatures, consisting essentially of, a major percentage of a ferrous ingredient consisting of an iron-nickel alloy wherein the iron varies between 60% and 68% and the nickel varies between 40% and 32% by weight of the ingredient respectively, graphite ranging between 10% and 30% by weight of the element wherein natural coarse flake graphite makes up 100% of the graphite ingredient at the low end of the graphite range and not more than 50% of the graphite ingredient at the high end of the graphite range, together with minor percentage of a friction modifying agent taken from the class consisting of bismuth, copper, lead, mullite and molybdenum disulfide.

7. A metallic friction member for use in rubbing contact with another surface wherein the coefficient of friction is stabilized over a wide range of operating temperatures, consisting essentially of, at least 67 parts of a ferrous ingredient comprising an iron-nickel alloy consisting of 64% iron and 36% nickel by weight of the ingredient respectively, graphite in quantities of at least 10 parts and not greater than 30 parts by weight wherein the proportion of flake graphite varies inversely between 100% and 50% of the graphite ingredient with artificial graphite making up the remainder.

8. A metallic friction member for use in rubbing contact with another surface wherein the coefficient of friction is stabilized over a wide range of operating temperatures, consisting essentially of, 100 parts iron-nickel alloy consisting of iron 64% and nickel 36%, 20 parts graphite, 8 parts copper and 5 parts bismuth.

9. A metallic friction member for use in rubbing contact with another surface wherein the coefficient of friction is stabilized over a wide range of operating temperatures, consisting essentially of, 67 parts iron-nickel alloy consisting of iron 64% and nickel 36%, 15 parts artificial graphite, 15 parts flake graphite, 5 parts copper, 5 parts bismuth and 5 parts lead.

10. A metallic friction member for use as a brake, clutch or the like, comprising, a sintered element consisting essentially of a matrix of an alloy of iron and nickel which has a coefficient of thermal expansion within substantially the same range as the coefficient of expansion of graphite, said ingredient making up more than 50% by weight of the member, and graphite intimately interspersed through said allow matrix and mechanically held therein in quantities of from 10% to 30% by weight of the member.

References Cited in the file of this patent

UNITED STATES PATENTS

| | | |
|---|---|---|
| 2,767,463 | Tacvorian | Oct. 23, 1956 |
| 2,784,105 | Stedman et al. | Mar. 5, 1957 |
| 2,848,795 | Lowey | Aug. 26, 1958 |
| 2,863,211 | Wellman | Dec. 9, 1958 |
| 2,893,112 | Moore et al. | July 7, 1959 |
| 2,945,291 | Ankeny et al. | July 19, 1960 |